(12) United States Patent
Salomon et al.

(10) Patent No.: US 11,366,821 B2
(45) Date of Patent: *Jun. 21, 2022

(54) EPSILON-CLOSURE FOR FREQUENT PATTERN ANALYSIS

(71) Applicant: salesforce.com, inc., San Francisco, CA (US)

(72) Inventors: Yacov Salomon, Danville, CA (US); Kexin Xie, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/119,960

(22) Filed: Aug. 31, 2018

(65) Prior Publication Data

US 2019/0362010 A1 Nov. 28, 2019

Related U.S. Application Data

(60) Provisional application No. 62/676,798, filed on May 25, 2018.

(51) Int. Cl.
  *G06F 16/2458* (2019.01)
  *G06F 16/28* (2019.01)
  *G06F 16/901* (2019.01)

(52) U.S. Cl.
  CPC ........ *G06F 16/2465* (2019.01); *G06F 16/285* (2019.01); *G06F 16/9024* (2019.01); *G06F 16/9027* (2019.01); *G06F 2216/03* (2013.01)

(58) Field of Classification Search
  CPC .............. G06F 16/2465; G06F 16/285; G06F 16/9024; G06F 16/9027; G06F 2216/03
  See application file for complete search history.

(56) References Cited

U.S. PATENT DOCUMENTS

| 2010/0179955 | A1* | 7/2010 | Wu | G06F 16/2465 |
| | | | | 707/748 |
| 2016/0132504 | A1* | 5/2016 | Young | G06F 40/284 |
| | | | | 707/737 |
| 2017/0024395 | A1* | 1/2017 | Michelson | G06F 16/287 |
| 2018/0107695 | A1* | 4/2018 | Yang | G06F 16/2282 |
| 2018/0124082 | A1* | 5/2018 | Siadati | G06N 5/047 |
| 2018/0316571 | A1* | 11/2018 | Andrade | G06Q 10/06398 |
| 2019/0272339 | A1* | 9/2019 | Wang | G06K 9/6298 |

\* cited by examiner

*Primary Examiner* — Mariela Reyes
*Assistant Examiner* — Fatima P Mina
(74) *Attorney, Agent, or Firm* — Holland & Hart LLP

(57) ABSTRACT

Methods, systems, and devices supporting epsilon ($\varepsilon$)-closure for frequent pattern (FP) analysis are described. Some database systems may analyze data sets to determine FPs. In some cases, the FP set may include a large number of semi-redundant patterns, resulting in significant memory or processing overhead. To reduce the redundancy of these patterns, the database system may implement pre-configured or dynamic threshold occurrence differences (e.g., $\varepsilon$ values) to test against related patterns. For example, the database system may calculate the difference between the data objects covered by a sub-pattern and a super-pattern (e.g., where the super-pattern includes all the same data attributes of the sub-pattern, plus one additional attribute). This difference may be compared to a corresponding $\varepsilon$ value, and if the difference is less than the $\varepsilon$ value, the database system may remove one of the patterns (e.g., the sub-pattern) from the set of valid FPs to limit redundancy.

18 Claims, 8 Drawing Sheets

EPSILON-CLOSURE FOR FREQUENT PATTERN ANALYSIS

CROSS REFERENCES

The present Application for Patent claims priority to U.S. Provisional Patent Application No. 62/676,798 by Salomon et al., entitled "Epsilon-Closure For Frequent Pattern Analysis," filed May 25, 2018, which is assigned to the assignee hereof and expressly incorporated by reference herein.

FIELD OF TECHNOLOGY

The present disclosure relates generally to database systems and data processing, and more specifically to epsilon ($\varepsilon$)-closure for frequent pattern (FP) analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may support frequent pattern (FP) analysis for data sets. For example, a data processing machine may determine FPs based on data in a database or data indicated by a user device. However, performing FP analysis on a data set with many common or prevalent data attributes may result in a very large number of resulting FPs. For example, if the data set contains one or more data attributes that correspond to the majority of data objects in the set, these data attributes may be added to almost any pattern with sufficient frequency for the data set, and the resulting "new" pattern will maintain sufficient frequency to also be included in the FP set. However, this "new" pattern may not contain a significant amount of interesting information to differentiate it over the sub-pattern it is built off of (e.g., the same pattern minus the prevalent data attribute). Semi-redundant patterns like these may greatly increase the memory and processing overhead of the FP mining procedure (e.g., based on the increased number of patterns to manage), as well as increasing latency of the FP analysis, without significantly improving the value of the determined FPs.

DETAILED DESCRIPTION

Figure 1:
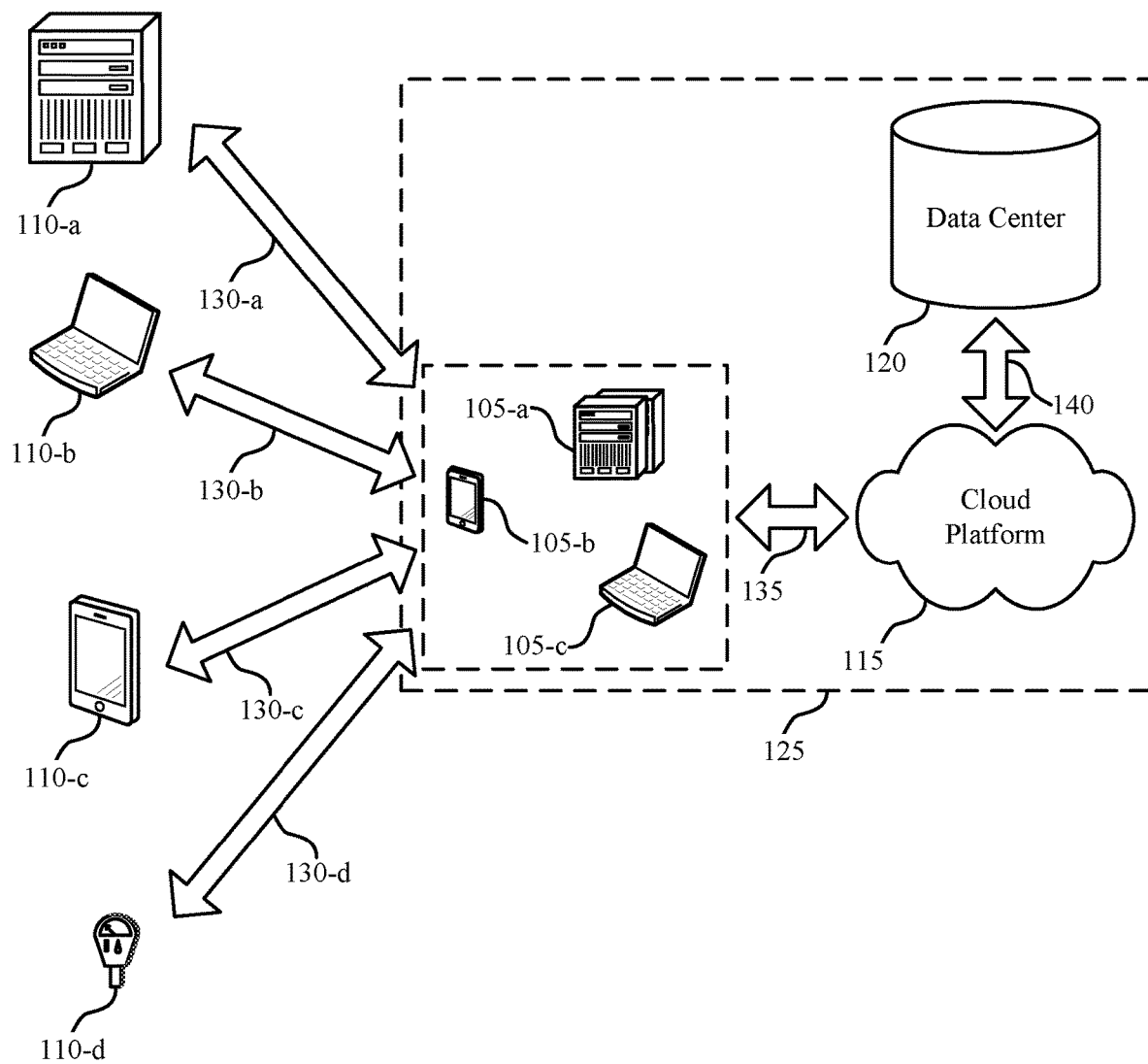
FIG. 1 illustrates an example of a system for frequent pattern (FP) analysis at a database system that supports epsilon ($\varepsilon$)-closure for FP analysis in accordance with aspects of the present disclosure.

Some database systems may perform frequent pattern (FP) analysis on data sets to determine common and interesting patterns within the data. These patterns may be useful to users for many customer relationship management (CRM) operations, such as marketing analysis or sales tracking. In some cases, a database system may automatically determine FPs for one or more data sets based on a configuration of the database system. In other cases, the database system may receive a command from a user device (e.g., based on a user input at the user device) to determine FPs for a data set. The database system may determine the FPs within a data set using one or more FP mining techniques. For example, for improved efficiency of the system and for a shorter latency in determining the patterns, the database system may transform the data set into a condensed data structure including an FP-tree and a linked list, and may use an FP-growth model to derive the FPs. This condensed data structure may support faster FP mining than the original data set (e.g., a data set stored as a relational database table) can support, as well as faster querying of the determined patterns. For example, because the database system—or, more specifically, a data processing machine (e.g., a bare-metal machine, virtual machine, or container) at the database system—can generate the condensed data structure with just two passes through a data set, and because determining the FPs from the condensed data structure may be on a scale of approximately one to two orders of magnitude faster than determining the FPs from the original data, the database system may significantly improve the latency involved in deriving the FPs and the corresponding patterns of interest. Furthermore, if these FPs are stored and processed locally at the data processing machine, querying latency to retrieve the patterns (e.g., by a user device for processing or display) may be greatly reduced, as the data processing machine may handle the query locally without having to hit a database of the database system.

In some cases, the FP-growth model may derive a massive number of patterns based on a data set. This large set of patterns may incur a significant memory or processing overhead at the database system, reducing the efficiency of the FP mining and analysis process. However, many of these patterns may be very similar in both data attributes and support (i.e., frequency within the data set). For example, when comparing two related patterns, a sub-pattern containing data attributes {a, b} may correspond to 10,000 data objects in the data set, while a super-pattern containing data attributes {a, b, c} may correspond to 9,993 of these data objects. As such, the information gained by these two patterns may be referred to as redundant or semi-redundant, as adding the data attribute {c} to the pattern {a, b} may have no significant effect on the data object set covered. Storing and processing both of these patterns in the database system or at a data processing machine may increase memory overhead, processing resource overhead, and processing latency, with minimal information gained as a result.

To reduce the redundancy and more efficiently manage the memory and processing resources of the database system, the database system may implement epsilon (ε)-closure. In ε-closure, the system may determine a semi-static or dynamic threshold occurrence difference (e.g., ε value) between related patterns. For example, if the database system identifies a sub-pattern and super-pattern with a difference in support values that is less than a corresponding ε value, the database system may determine to remove either the sub-pattern or super-pattern to limit redundancy and improve management of resources in the system. For example, the system may remove the sub-pattern from the set of FPs. If this ε-closure procedure is performed for the entire set of potential FPs, the resulting set of FPs may be greatly reduced in size, without significantly affecting the information or insight provided by the FPs.

In some cases, the database system may utilize a single ε value for all FP mining procedures. In other cases, the database system may utilize data set-specific ε values, for example, based on the size or attribute spread of each data set. In yet other cases, the database system may utilize different ε values for different ε-closure procedures for a single data set, where the different ε values may be based on the sub-pattern, super-pattern, or both being analyzed for the ε-closure procedure.

Aspects of the disclosure are initially described in the context of an environment supporting an on-demand database service. Additional aspects of the disclosure are described with reference to a database system and processes for ε-closure. Aspects of the disclosure are further illustrated by and described with reference to apparatus diagrams, system diagrams, and flowcharts that relate to ε-closure for FP analysis.

FIG. 1 illustrates an example of a system 100 for cloud computing that supports ε-closure for FP analysis in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, a data center 120 may perform FP analysis on data sets to determine common and interesting patterns within the data. These patterns may be useful to users (e.g., cloud clients 105, contacts 110, etc.) for many CRM operations, such as marketing analysis or sales tracking. In some cases, a data center 120 may automatically determine FPs for one or more data sets based on a configuration of the data center 120. In other cases, the data center 120 may receive a command from a cloud client 105 to determine FPs for a data set. The data center 120 may determine the FPs within a data set using one or more FP mining techniques. For example, for improved efficiency of the system and for a shorter latency in determining the patterns, the data center 120 may transform the data set into a condensed data structure including an FP-tree and a linked list, and may use an FP-growth model to derive the FPs. This condensed data structure may support faster FP mining than the original data set (e.g., a data set stored as a relational database table), and may also support faster querying of the determined patterns. For example, because the data center 120—or, more specifically, a data processing machine (e.g., a bare-metal machine, virtual machine, or container) at the data center 120—can generate the condensed data structure with just two passes through a data set, and because determining the FPs from the condensed data structure may be on a scale of approximately one to two orders of magnitude faster than determining the FPs from the original data set, the data center 120 may significantly improve the latency involved in deriving the FPs and the corresponding patterns of interest. Furthermore, if these FPs are stored and processed locally at the data processing machine, a querying latency for retrieving the patterns (e.g., by a cloud client 105 for processing or display) may be greatly reduced, as the data processing machine may handle the query locally without having to hit a database of the data center 120.

In some cases, the FP-growth model may derive a massive number of patterns based on a data set. This large set of patterns may incur a significant memory or processing overhead at the data center 120, reducing the efficiency of the FP mining and analysis process. However, many of these patterns may be very similar in both data attributes and support (i.e., frequency within the data set). As such, the information gained by these two patterns may be referred to as redundant or semi-redundant, and may have no significant effect on the data object set covered. Storing and processing both of these patterns in the data center 120 or at a data processing machine may increase memory overhead, processing resource overhead, and processing latency, with minimal information gained as a result.

To reduce the redundancy and more efficiently manage the memory and processing resources of the data center 120, the data center 120 may implement ε-closure. In ε-closure, the data center 120 may determine a semi-static or dynamic threshold occurrence difference (e.g., ε value) between related patterns. For example, if the data center 120 identifies a sub-pattern and super-pattern with a difference in support values that is less than a corresponding ε value, the data center 120 may determine to remove either the sub-pattern or super-pattern to limit redundancy and improve management of resources in the system. For example, the data center 120 may remove the sub-pattern from the set of FPs. If this ε-closure procedure is performed for the entire set of potential FPs, the resulting set of FPs may be greatly reduced in size, without significantly affecting the information or insight provided by the FPs. In some cases, the data center 120 selects (e.g., removes or keeps) patterns based on whether patterns satisfy a pattern selection condition. For example, the pattern action condition is based at least on the semi-static or dynamic threshold occurrence difference (e.g., ε value) between related patterns, as described herein. The pattern selection condition may be further based on user selection, based on an algorithm, computational constraints of the database system, a configuration (e.g., in code) of the database system, or some combination of these.

In some cases, the data center 120 may utilize a single ε value for all FP mining procedures. In other cases, the data center 120 may utilize data set-specific ε values, for example, based on the size or attribute spread of each data set. In yet other cases, the data center 120 may utilize different ε values for different ε-closure procedures for a single data set, where the different ε values may be based on the sub-pattern, super-pattern, or both being analyzed for the ε-closure procedure.

In conventional systems, FP mining may identify any patterns of attributes that occur at or above a certain frequency threshold within a data set. However, the conventional FP mining may not determine redundancy between the derived FPs. Accordingly, for large sets of data, these conventional systems may output very large sets of FPs, that may incur a huge memory or processing resource overhead on the database system. As many of these patterns may cover similar sets of attributes and sets of data objects, the information gained by certain patterns may be minimal or insignificant.

The system 100 may implement ε-closure to reduce the redundancy of the output set of FPs. By removing additional patterns that cover both similar sets of data attributes and data objects in a data set, the system 100 may limit the output set of FPs to uniquely interesting patterns. Reducing the number of patterns in the derived set of FPs may reduce the memory resources needed to store the patterns, the processing resources needed to analyze the patterns, and the processing latency associated with analyzing the patterns. This may improve the efficiency of the FP mining and FP analysis process performed by the data center 120.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
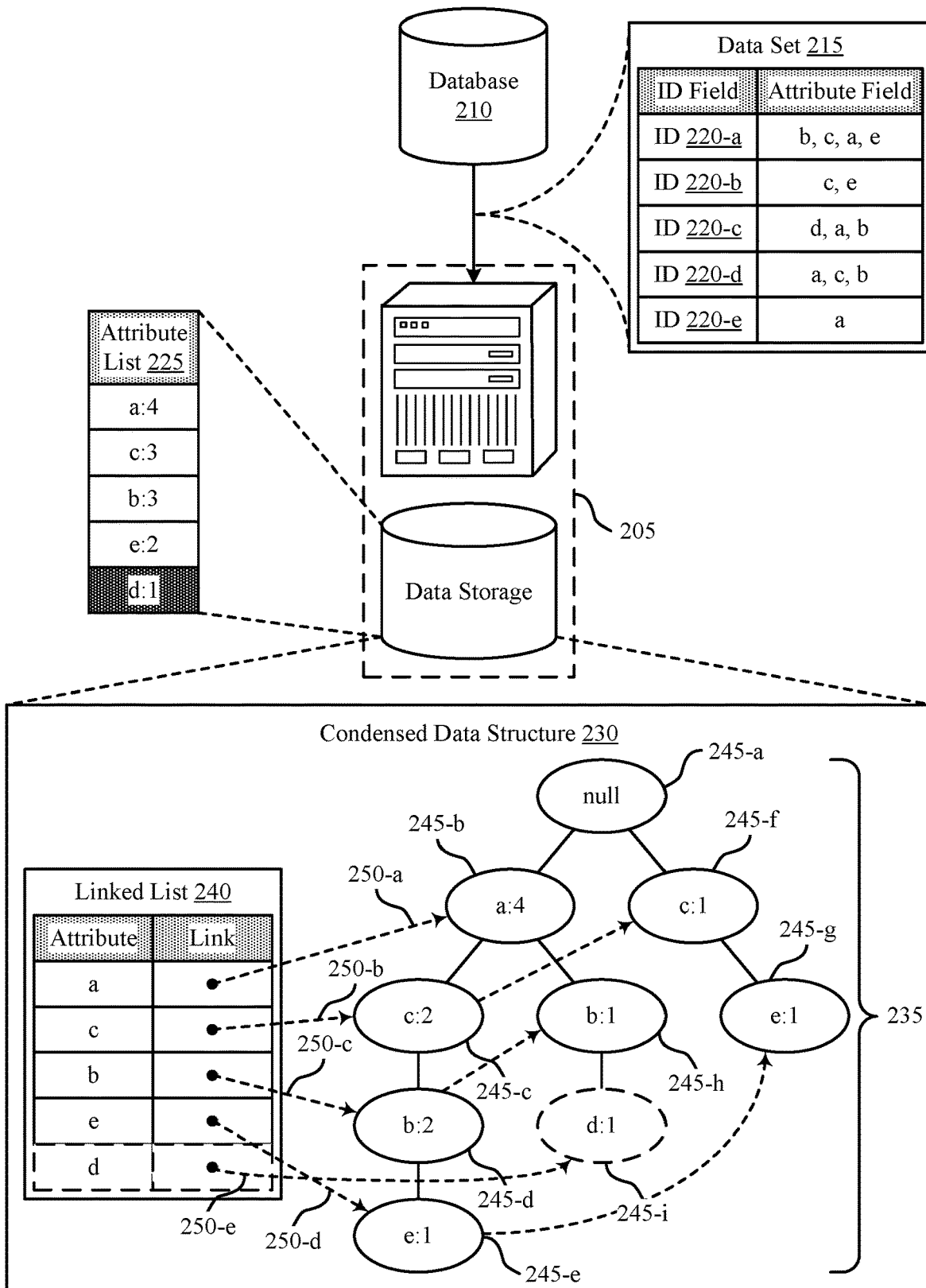
FIG. 2 illustrates an example of a database system implementing an FP analysis procedure that supports $\varepsilon$-closure for FP analysis in accordance with aspects of the present disclosure.

FIG. 2 illustrates an example of a database system 200 implementing an FP analysis procedure that supports ε-closure for FP analysis in accordance with aspects of the present disclosure. The database system 200 may be an example of a data center 120 as described with reference to FIG. 1, and may include a database 210 and a data processing machine 205. In some cases, the database 210 may be an example of a transactional database, a time-series database, a multi-tenant database, or some combination of these or other types of databases. The data processing machine 205 may be an example of a database server, an application server, a server cluster, a virtual machine, a container, or some combination of these or other hardware or software components supporting data processing for the database system 200. The data processing machine 205 may include a processing component and a local data storage component, where the local data storage component supports the memory resources of the data processing machine 205 and may be an example of a magnetic tape, magnetic disk, optical disc, flash memory, main memory (e.g., random-access memory (RAM)), memory cache, cloud storage system, or combination thereof. The data processing machine 205 may perform an FP analysis on a data set 215 (e.g., based on a user input command, or automatically based on a configuration of the database system 200 or a supported FP-based application).

As described herein, the database system 200 may implement an FP-growth model for pattern mining that utilizes a condensed data structure 230. The condensed data structure 230 may include an FP-tree 235 and a linked list 240 linked to the nodes 245 of the FP-tree 235 via links 250. However, it is to be understood that the database system 200 may alternatively use other FP analysis techniques and data structures than those described. For example, the database system 200 may use a candidate set generation-and-test technique, a tree projection technique, or any combination of these or other FP analysis techniques. In other cases, the database system 200 may perform an FP analysis procedure similar to the one described herein but containing, fewer, additional, or alternative processes to those described. The techniques for ε-closure described may be implemented with the FP-growth technique and the condensed data structure 230, or with any other FP analysis technique or data structure.

The data processing machine 205 may receive a data set 215 for processing. For example, the database 210 may transmit the data set 215 to the data processing machine 205 for FP analysis. The data set 215 may include multiple data objects, where each data object includes an identifier (ID) 220 and a set of data attributes. The data set 215 may include all data objects in the database 210, or may include data objects associated with a certain tenant (e.g., if the database 210 is a multi-tenant database), with a certain time period (e.g., if the attributes are associated with events or activities with corresponding timestamps), or with some other subset of data objects based on a user input value. For example, in some cases, a user operating a user device may select one or more parameters for the data set 215, and the user device may transmit the parameters to the database 210 (e.g., via a database or application server). The database 210 may transmit the data set 215 to the data processing machine 205 based on the received user input.

Each data object in the data set 215 may be identified based on an ID 220, and may be associated with one or more data attributes. These data attributes may be unique to that data object, or may be common across multiple data objects. In some cases, an ID 220 may be an example of a text string unique to that data object. For example, if the data objects correspond to users in the database system 200, the IDs 220 may be user identification numbers, usernames, social security numbers, or some other similar form of ID where each value is unique to a user. The data attributes may be examples of activities performed by a data object (e.g., a user) or characteristics of the data object. For example, the data attributes may include information related to user devices operated by a user (e.g., internet protocol (IP) addresses, a total number of devices operated, etc.), information related to activities performed by the user while operating one of the user devices (e.g., web search histories, software application information, email communications, etc.), information related specifically to the user (e.g., information from a user profile, values or scores associated with the user, etc.), or a combination thereof. As illustrated in FIG. 2, these different data attributes may be represented by different letters (e.g., attributes {a}, {b}, {c}, {d}, and {e}).

In the exemplary case illustrated, the data set 215 may include five data objects. The first data object with ID 220-a may include data attributes {b, c, a, e}, the second data object with ID 220-b may include data attributes {c, e}, the third data object with ID 220-c may include data attributes {d, a, b}, the fourth data object with ID 220-d may include data attributes {a, c, b}, and the fifth data object with ID 220-e may include data attribute {a}. In one example, each data object may correspond to a different user or user device, and each data attribute may correspond to an activity or activity parameter performed by the user or user device. For example, attribute {a} may correspond to a user making a particular purchase online, while attribute {b} may correspond to a user visiting a particular website in a web browser of a user device. These data attributes may be binary values (e.g., Booleans) related to characteristics of a user.

The data processing machine 205 may receive the data set 215, and may construct a condensed data structure 230 based on the data set 215. The construction process may involve two passes through the data set 215, where the data processing machine 205 processes the data attributes for each data object in the data set 215 during each pass. In a first pass through the data set 215, the data processing machine 205 may generate an attribute list 225. The attribute list 225 may include the data attributes contained in the data set 215, along with their corresponding supports (i.e., occurrence frequencies within the data set 215). In some cases, during this first pass, the data processing machine 205 may filter out one or more attributes based on the supports for the attributes and a minimum support threshold, $\xi$. In these cases, the resulting data attributes included in the attribute list 225 may be referred to as frequent items or frequent attributes. The data processing machine 205 may order the data attributes in the attribute list 225 in descending order of support. For example, as illustrated, data processing machine 205 may identify that attribute {a} occurs four times in the data set 215, attributes {c} and {b} occur three times, attribute {e} occurs two times, and attribute {d} occurs one time. If the minimum support threshold, $\xi$, is equal to two, the data processing machine 205 may remove {d} from the attribute list 225 (or otherwise not included {d} in the attribute list 225) because the support for attribute {d} is less than the minimum support threshold. In some cases, a user may specify the minimum support threshold, $\xi$, using input features of a user interface. The data processing machine 205 may store the attribute list 225 in memory (e.g., temporary memory or persistent memory).

In a second pass through the data set 215, the data processing machine 205 may generate the condensed data structure 230 for efficient FP mining, where the condensed data structure 230 includes an FP-tree 235 and a linked list 240. The data processing machine 205 may generate a root node 245-a for the FP-tree 235, and may label the root node 245-a with a "null" value. Then, for each data object in the data set 215, the data processing machine 205 may order the attribute fields according to the order of the attribute list 225 (e.g., in descending order of support), and may add or update a branch of the FP-tree 235. For example, the data processing machine 205 may order the data attributes for the first data object with ID 220-a in order of descending support {a, c, b, e}. As no child nodes 245 exist in the FP-tree 235, the data processing machine 205 may create new child nodes 245 representing this ordered set of data attributes. The node for the first attribute in the ordered set is created as a child node 245-b of the root node 245-a, the node for the second attribute is created as a further child node 245-c off of this child node 245-b, and so on. For example, the data processing machine may create node 245-b for attribute {a}, node 245-c for attribute {c}, node 245-d for attribute {b}, and node 245-e for attribute {e} based on the order of descending support. When creating a new node 245 in the FP-tree 235, the data processing machine 205 may additionally set the count for the node 245 to one (e.g., indicating the one instance of the data attribute represented by the node 245).

The data processing machine 205 may then process the second data object with ID 220-b. The data processing machine 205 may order the data attributes as {c, e} (e.g., based on the descending order of support as determined in the attribute list 225), and may check the FP-tree 235 for any nodes 245 stemming from the root node 245-a that correspond to this pattern. As the first data attribute of this ordered set is {c}, and the root node 245-a does not have a child node 245 for {c}, the data processing machine 205 may create a new child node 245-f from the root node 245-a for attribute {c} and with a count of one. Further, the data processing machine 205 may create a child node 245-g off of this {c} node 245-f, where node 245-g represents attribute {e} and is set with a count of one.

As a next step in the process, the data processing machine 205 may order the attributes for the data object with ID 220-c as {a, b, d} and may add this ordered set to the FP-tree 235. In some cases, if data attribute {d} does not have a significantly large enough support value (e.g., as compared to the minimum support threshold, $\xi$), the data processing machine 205 may ignore the {d} data attribute (and any other data attributes that are not classified as frequent attributes) in the list of attributes for the data object. In either case, the data processing machine 205 may check the FP-tree 235 for any nodes 245 stemming from the root node 245-a that correspond to this ordered set. Because child node 245-b for attribute {a} stems from the root node 245-a, and the first attribute in the ordered set for the data object with ID 220-c is {a}, the data processing machine 205 may determine to increment the count for node 245-b rather than create a new node 245. For example, the data processing machine 205 may change node 245-b to indicate attribute {a} with a count of two. As the only child node 245 off of node 245-b is child node 245-c for attribute {c}, and the next attribute in the ordered set for the data object with ID 220-c is attribute {b}, the data processing machine 205 may generate a new child node 245-h off of node 245-b that corresponds to attribute {b} and may assign the node 245-h a count of one. If attribute {d} is included in the attribute list 225, the data processing machine 205 may additionally create child node 245-i for {d}.

This process may continue for each data object in the data set 215. For example, in the case illustrated, the data object with ID 220-d may increment the counts for nodes 245-b, 245-c, and 245-d, and the data object with ID 220-e may increment the count for node 245-b. Once the attributes—or the frequent attributes, when implementing a minimum support threshold—from each data object in the data set 215 are represented in the FP-tree 235, the FP-tree 235 may be complete in memory of the data processing machine 205 (e.g., stored in local memory for efficient processing and FP mining, or stored externally for improved memory capacity). By generating the ordered attribute list 225 in the first pass through the data set 215, the data processing machine 205 may minimize the number of branches needed to represent the data, as the most frequent data attributes are included closest to the root node 245-a. This may support efficient storage of the FP-tree 235 in memory. Additionally, generating the attribute list 225 allows the data processing machine 205 to identify infrequent attributes and remove these infrequent attributes when creating the FP-tree 235 based on the data set 215.

In addition to the FP-tree 235, the condensed data structure 230 may include a linked list 240. The linked list 240 may include all of the attributes from the attribute list 225 (e.g., all of the attributes in the data set 215, or all of the frequent attributes in the data set 215), and each attribute may correspond to a link 250. Within the table, these links 250 may be examples of head of node-links, where the node links point to one or more nodes 245 of the FP-tree 235 in sequence or in parallel. For example, the entry in the linked list 240 for attribute {a} may be linked to each node 245 in the FP-tree 235 for attribute {a} via link 250-a (e.g., in this case, attribute {a} is linked to node 245-b). If there are multiple nodes 245 in the FP-tree 235 for a specific attribute, the nodes 245 may be linked in sequence. For example, attribute {c} of the linked list 240 may be linked to nodes 245-c and 245-f in sequence via link 250-b. Similarly, link 250-c may link attribute {b} of the linked list 240 to nodes 245-d and 245-h, link 250-d may link attribute {e} to nodes 245-e and 245-g, and—if frequent enough to be included in the attribute list 225—link 250-e may link attribute {d} to node 245-i.

In some cases, the data processing machine 205 may construct the linked list 240 following completion of the FP-tree 235. In other cases, the data processing machine 205 may construct the linked list 240 and the FP-tree 235 simultaneously, or may update the linked list 240 after adding each data object representation from the data set 215 to the FP-tree 235. The data processing machine 205 may also store the linked list 240 in memory along with the FP-tree 235. In some cases, the linked list 240 may be referred to as a header table (e.g., as the "head" of the node-links are located in this table). Together, these two structures form the condensed data structure 230 for efficient FP-mining at the data processing machine 205. The condensed data structure 230 may contain all information relevant to FP mining from the data set 215 (e.g., for a minimum support threshold, $\xi$). In this way, transforming the data set 215 into the FP-tree 235 and corresponding linked list 240 may support complete and compact FP mining.

The data processing machine 205 may perform a pattern growth method, FP-growth, to efficiently mine FPs from the information compressed in the condensed data structure 230. In some cases, the data processing machine 205 may determine the complete set of FPs for the data set 215. In other cases, the data processing machine 205 may receive a data attribute of interest (e.g., based on a user input in a user interface), and may determine all patterns for that data attribute. In yet other cases, the data processing machine 205 may determine a single "most interesting" pattern for a data attribute or a data set 215. The "most interesting" pattern may correspond to the FP with the highest occurrence rate, the longest list of data attributes, or some combination of a high occurrence rate and long list of data attributes. For example, the "most interesting" pattern may correspond to the FP with a number of data attributes greater than an attribute threshold with the highest occurrence rate, or the "most interesting" pattern may be determined based on a formula or table indicating a tradeoff between occurrence rate and length of the attribute list. In some cases, the data processing machine 205 determine a set (e.g., one or more) of "most interesting" patterns corresponding to the FPs with the highest occurrence rate, the longest list of data attributes, or some combination of a high occurrence rate and long list of data attributes.

To determine all of the patterns for a data attribute, the data processing machine 205 may start from the head of a link 250 and follow the node link 250 to each of the nodes 245 for that attribute. The FPs may be defined based on a minimum support threshold, $\xi$, which may be the same minimum support threshold as used to construct the condensed data structure 230. For example, if ξ=2, a pattern is only considered "frequent" if it appears two or more times in the data set 215. To identify the complete set of FPs for the data set 215, the data processing machine 205 may perform the mining procedure on the attributes in the linked list 240 in ascending order. As attribute {d} does not pass the minimum support threshold of ξ=2, the data processing machine 205 may initiate the FP-growth method with data attribute {d}.

To determine the FPs for data attribute {e}, the data processing machine 205 may follow link 250-d for attribute {e}, and may identify node 245-e and node 245-g both corresponding to attribute {e}. The data processing machine 205 may identify that data attribute {e} occurs two times in the FP-tree 235 (e.g., based on summing the count values for the identified nodes 245-e and 245-g), and thus has at least the simplest FP of (e:2) (i.e., a pattern including attribute {e} occurs twice in the data set 215). The data processing machine 205 may determine the paths to the identified nodes 245, {a, c, b, e} and {c, e}. Each of these paths occurs once in the FP-tree 235. For example, even though node 245-b for attribute {a} has a count of four, this attribute {a} appears together with attribute {e} only once (e.g., as indicated by the count of one for node 245-e). These identified patterns may indicate the path prefixes for attribute {e}, namely {a:1, c:1, b:1} and {c:1}. Together, these path prefixes may be referred to as the sub-pattern base or the conditional pattern base for data attribute {e}. Using the determined conditional pattern base, the data processing machine 205 may construct a conditional FP-tree for attribute {e}. That is, the data processing machine 205 may construct an FP-tree using similar techniques as those described herein, where the FP-tree includes only the attribute combinations that include attribute {e}. Based on the minimum support threshold, ξ, and the identified path prefixes {a:1, c:1, b:1} and {c:1}, only data attribute {c} may pass the support check. Accordingly, the conditional FP-tree for data attribute {e} may contain a single branch, where the root node 245 has a single child node 245 for attribute {c} with a count of two (e.g., as both of the path prefixes include attribute {c}). Based on this conditional tree, the data processing machine 205 may derive the FP (ce:2). That is, the attributes {c} and {e} occur together twice in the data set 215, while attribute {e} does not occur at least two times in data set 215 with any other data attribute. For conditional FP-trees with greater than one child node 245, the data processing machine 205 may implement a recursive mining process to determine all eligible FPs that contain the attribute being examined. The data processing machine 205 may return the FPs (e:2) and (ce:2) for the data attribute {e}. In some cases, the data processing machine 205 may not count patterns that simply contain the data attribute being examined as FPs, and, in these cases, may just return (ce:2).

This FP-growth procedure may continue with attribute {b}, then attribute {c}, and conclude with attribute {a}. For each data attribute, the data processing machine 205 may construct a conditional FP-tree. Additionally, because the FP-growth procedure is performed in an ascending order through the linked list 240, the data processing machine 205 may ignore child nodes 245 of the linked nodes 245 when determining the FPs. For example, for attribute {b}, the link 250-c may indicate nodes 245-d and 245-h. When identifying the paths for {b}, the data processing machine 205 may not traverse the FP-tree 235 past the linked nodes 245-d or 245-h, as any patterns for the nodes 245 below this on the tree were already determined in a previous step. For example, the data processing machine 205 may ignore node 245-e when determining the patterns for node 245-d, as the patterns including node 245-e were previously derived. Based on the FP-growth procedure and these conditional FP-trees, the data processing machine 205 may identify additional FPs for the rest of the data attributes in the linked list 240. For example, using a recursive mining process and based on the minimum support threshold of ξ=2, the data processing machine 205 may determine the complete set of FPs: (e:2), (ce:2), (b:3), (cb:2), (ab:3), (acb:2), (c:3), (ac:2), and (a:4).

In some cases, the data processing machine 205 may store the resulting patterns locally in a local data storage component. Additionally or alternatively, the data processing machine 205 may transmit the patterns resulting from the FP analysis to the database 210 for storage, or to a user device (e.g., for further processing or to display in a user interface). In some cases, the data processing machine 205 may determine a "most interesting" FP (e.g., (acb:2) based on the number of data attributes included in the pattern), and may transmit an indication of the "most interesting" FP to the user device. In other cases, the user device may transmit an indication of an attribute for examination (e.g., data attribute {c}), and the data processing machine 205 may return one or more of the FPs including data attribute {c} in response.

By transforming the data set 215 into the condensed data structure 230, the data processing machine 205 may avoid the need for generating and testing a large number of candidate patterns, which can be very costly in terms of processing and memory resources, as well as in terms of time. For very large database systems 200, databases 210, or data sets 215, the FP-tree 235 may be much smaller than the size of the data set 215, and the conditional FP-trees may be even smaller. For example, transforming a large data set 215 into an FP-tree 235 may shrink the data by a factor of approximately one hundred, and transforming the FP-tree 235 into a conditional FP-tree may again shrink the data by a factor of approximately one hundred, resulting in very condensed data structures 230 for FP mining.

In some cases, the FP analysis procedure may support additional techniques for improved FP analysis or data handling. For example, the database system 200 may support techniques for distributed systems, differential support, ε-closure, or a combination thereof. In some cases, the FPs resulting from FP mining for the data set 215 may include a large number of redundant patterns (e.g., patterns with very similar attribute lists and very similar frequency numbers). These redundant patterns may greatly increase the memory and processing overhead associated with FP mining, while adding very little interesting or different information. To reduce the number of redundant patterns, and correspondingly reduce the resource overhead at the data processing machine 205, the data processing machine 205 may implement ε-closure. In ε-closure, the data processing machine 205 may determine a threshold change in data objects for subsequent patterns. The data processing machine 205 may compare this threshold value to the actual change in data objects for subsequent patterns, and if the change is less than the ε value, the data processing machine 205 may remove the shorter pattern from the set of FPs. For example, if ε=10, and adding an additional data attribute to a pattern in the set of FPs reduces the data object count by 5, the change in data objects may be less than the ε value. Based on this ε-closure check, the data processing machine 205 may remove the sub-pattern from the set of FPs, and may replace it with the super-pattern including the additional data attribute that only differs by a data object count of 5.

Figure 3:
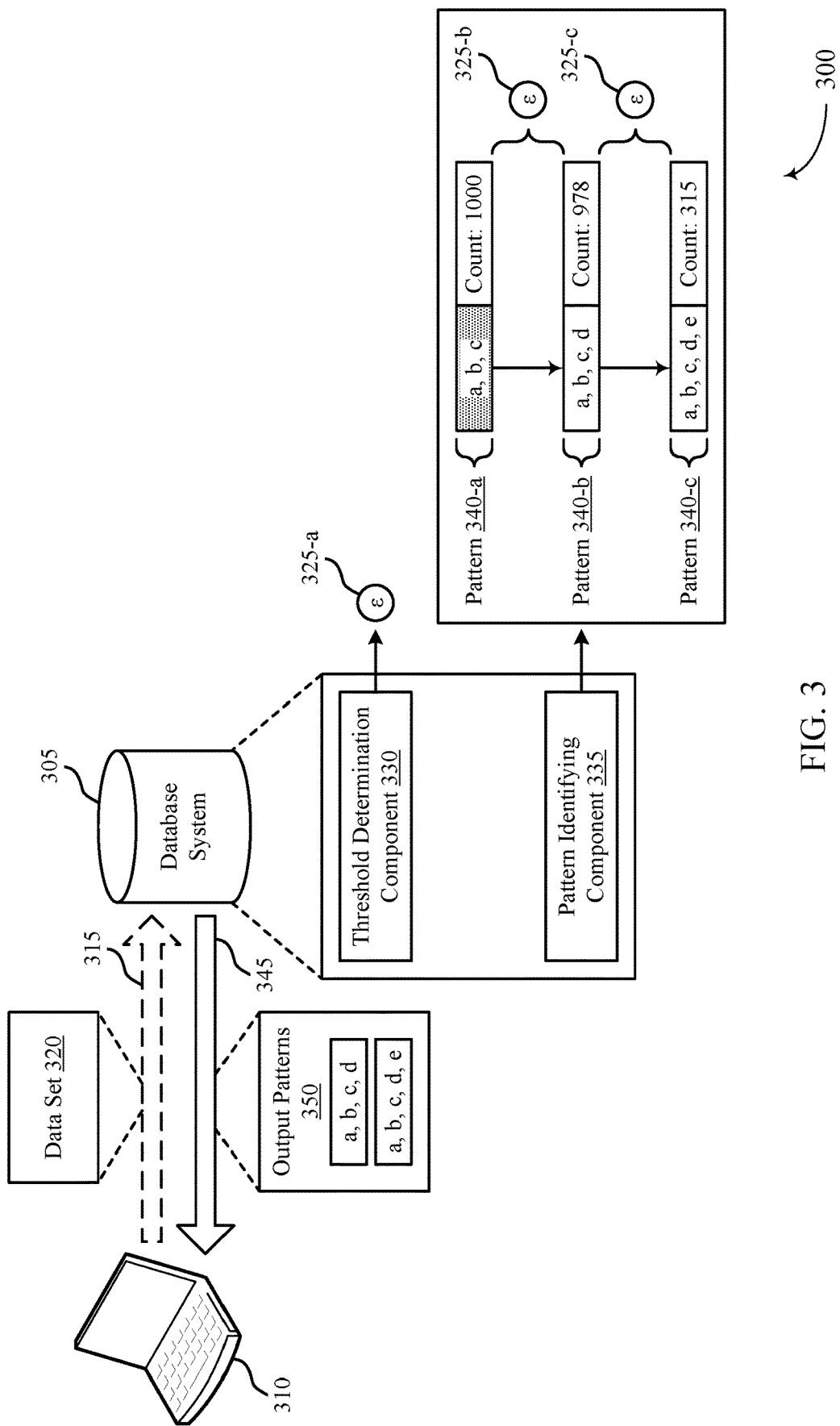
FIG. 3 illustrates an example of an $\varepsilon$-closure process for FP analysis in accordance with aspects of the present disclosure.

FIG. 3 illustrates an example of an ε-closure process 300 for FP analysis in accordance with aspects of the present disclosure. The ε-closure process 300 may include a database system 305, which may be an example of a data center 120 or a database system 200 as described with reference to FIGS. 1 and 2. In some cases, the database system 305 may interact with a user device 310. The user device 310 may transmit user input signals to the database system 305 for processing on a communication link 315, and the database system 305 may surface output patterns 350 to the user device 310 for processing or display via a communication link 345. In some cases, the database system 305 may receive a data set 320 for FP analysis from the user device 310. In other cases, the database system 305 may retrieve the data set 320 from a database of the database system 305 (e.g., based on a user input indicating the data set 320, or based on a configuration of the database system 305. The database system 305 may implement ε-closure for the FP analysis to improve the relevance of the resulting patterns and reduce the memory overhead associated with the output patterns 350.

For example, the database system 305 may include a threshold determination component 330. This threshold determination component 330 may identify a threshold occurrence difference (e.g., ε value 325-a) to use for ε-closure. In some cases, the database system 305 may utilize a global ε value 325-a that applies to all patterns 340 during an FP mining procedure. In other cases, the database system 305 may utilize different ε values 325 according to one or more parameters of the patterns 340, one or more data attributes in the patterns 340, the data set 320, or a user input signal or configuration from an administrative user of the database system 305 or from a client. The ε value 325 (e.g., either the global value 325-a or the dynamically changing ε values 325-b and 325-c) may be determined by the database system 305 based on an algorithm, computational constraints of the database system 305, a configuration (e.g., in code) of the database system 305, or some combination of these.

The database system 305 may additionally include a pattern identifying component 335, which may identify a set of potential patterns for the data set 320. For example, the database system 305 may perform an FP mining procedure as described herein, for example, with reference to FIG. 2, adjusted to implement ε-closure to reduce redundancy and improve efficient usage of memory and processing resources. For example, the adjusted FP mining procedure may test the changes in data objects between related sub-patterns and super-patterns to ensure that the change is significantly large enough (e.g., as defined by the ε closure value(s) 325) to warrant inclusion of both the sub-pattern and super-pattern in the determined FP list.

For example, during an FP mining procedure of a data set 320 (e.g., using an FP-growth model on a condensed data structure constructed to represent the data set 320), the pattern identifying component 335 may identify patterns 340-a and 340-b. As illustrated, pattern 340-a may be an example of a sub-pattern of pattern 340-b, and pattern 340-b may, correspondingly, be an example of a super-pattern of pattern 340-a. For example, pattern 340-a may include data attributes {a, b, c}, while pattern 340-b includes one additional data attribute, {d}, to form a set of data attributes {a, b, c, d}. The pattern identifying component may identify the support (i.e., frequency or count) for these patterns 340-a and 340-b in the data set 320. This count may correspond to the number of data objects (e.g., users or user devices) in data set 320 that include or correspond to each pattern 340. Both of these patterns 340 may pass a minimum support threshold check. For example, if ξ=100, both patterns 340 are sufficiently frequent in the data set 320 to be included in the FP list resulting from the FP mining procedure.

However, these patterns 340 may be examples of semi-redundant patterns 340. For example, the two patterns 340 differ by a single data attribute, and only differ in support by 22 data objects. For example, the count associated with pattern 340-a may be 1000, while the count associated with pattern 340-b may be 978. The pattern identifying component 335 may calculate the difference between these two count values, and may compare the difference to ε value 325-b (e.g., with an ε value 325 of 100). If the difference is less than the corresponding ε value 325-b, the pattern identifying component 335 may remove one of the patterns 340 from the list of output patterns 350 to reduce the redundancy and overhead of the list while maintaining patterns of interest. In some cases, the pattern identifying component 335 may remove the sub-pattern with fewer data attributes (i.e., pattern 340-a) from the list, and maintain the super-pattern with more data attributes (i.e., pattern 340-b) as a pattern to output. This may result in including patterns 340 in the output patterns 350 that have more specific sets of data attributes, as {a, b, c, d} may be included in place of the fairly redundant {a, b, c}, without narrowing the applicability to users by more than the corresponding ε value 325-b.

In some examples, pattern identifying component 335 may identify a further pattern 340-c based on patterns 340-a and 340-b. For example, pattern 340-c may be an example of a super-pattern to pattern 340-b, while pattern 340-b is correspondingly a sub-pattern to pattern 340-c. As illustrated, pattern 340-b includes data attributes {a, b, c, d} and a data object count of 978, while pattern 340-c adds an additional data attribute, {e}, in order to include data attributes {a, b, c, d, e} with a data object count of 315. The pattern identifying component 335 may calculate the difference between these two count values (e.g., the difference in support between patterns 340-b and 340-c in the data set 320), and may compare this calculated difference to the corresponding ε value 325-c. If the difference is greater than the ε value 325-c (e.g., if ξ=100), the database system 305 may identify that patterns 340-b and 340-c cover sufficiently different numbers of data objects (e.g., the density change between the patterns 340 is large enough for the patterns 340 to exist on their own as defined by the corresponding ε value 325-c), and accordingly may maintain both patterns 340-b and 340-c in the output patterns 350. After the database system 305 has performed ε-closure in this way for all super-patterns and sub-patterns in the FP list, the database system 305 may determine the resulting set of data attribute patterns (e.g., the FPs included in the output patterns 350, namely {a, b, c, d} and {a, b, c, d, e} in this case). The database system 305 may store these output patterns 350 in a database, store the output patterns 350 locally at a data processing machine, transmit the output patterns 350 to a user device 310 for further processing or display in a user interface, or perform some combination of these.

In some cases, the ε values 325 used for different ε-closure processes for a same data set 320 may be the same or different. For example, in a first case, the database system 305 may utilize a global ε value 325 for all ε-closure processes for a data set 320, or for any data set. In some cases, this global ε value 325 may be determined based on characteristics of the data set 320 (e.g., the number of data objects in the data set 320, the number of data attributes in the data set 320, the distribution of the data objects, data attributes, or both in the data set 320, etc.). One or more of these parameters may be input into an algorithm to determine the ε value 325. In some cases, the ε value 325 may be determined based on computational constraints of the database system 305. For example, if the database system 305 or a data processing machine of the database system 305 supports a limited number of output patterns 350 (e.g., due to memory storage constraints, processing resource constraints, etc.), the database system 305 may select or determine an ε value 325 large enough to reduce the number of output patterns 350 below the maximum number of output patterns 350 for the database system 305 or machine. In some cases, the database system 305 may receive a user input value that either sets the ε value 325, or influences the ε value 325 along with other parameters. In many cases, the ε-closure functionality may not be exposed to clients of the database system 305, and this user input may be received from an administrative user associated with maintaining or updating the database system 305 or code for operating the database system 305. In other cases, the ε-closure functionality may be exposed to clients, and a client of the database system 305 may adjust the ε value 325 based on a number of output patterns 350 that the client would like to receive from the database system 305.

In a second case, the database system 305 may utilize different ε values for different ε-closure procedures for a same data set 320. For example, the database system 305 may determine the different ε values 325 based on the number of data attributes or the types of data attributes in the sub-patterns and super-patterns for analysis. That is, ε value 325-*c* may be less than ε value 325-*b* based on super-pattern 340-*c* including five data attributes while super-pattern 340-*b* includes four. In other cases, the database system 305 may identify ε value 325-*b* based on a data category or data distribution for attributes {a}, {b}, {c}, or {d}. In some cases, the ε value 325-*b* is determined based on the type of distribution of the additional attribute (e.g., {d}) included in the super-pattern.

As described, the database system 305 may perform ε-closure for the differences between consecutive patterns 340 (e.g., super-patterns differing from sub-patterns by a single additional data attribute). However, in some cases, the database system 305 may perform ε-closure for any sub-patterns and super-patterns. For example, the database system 305 may calculate a difference in counts between pattern 340-*a* and pattern 340-*c*, and compare this difference to an ε value 325. The ε values 325 may be different based on the difference in number of data attributes between patterns 340. For example, the ε value 325 used when comparing pattern 340-*c* to sub-pattern 340-*a* may be greater than the ε value 325 used when comparing pattern 340-*c* to sub-pattern 340-*b*.

In one example use of the database system 305 described herein, the dataset 320 may contain 10,000 users that are associated with attributes of "bought a new car" and "lives in Boston," and of these 10,000 users, 9,850 may also be associated with the attribute "Red Sox fan." These attributes may be determined based on user interaction with one or more user devices (e.g., a contact 110 of FIG. 1). The database system 305 may reduce these patterns down to the most specific and interesting patterns, without compromising the relevancy of patterns. In the above introduced example, the semi-static or dynamic threshold occurrence difference (e.g., ε value) may be set to a value of 200. Because the difference between the number of users associated with the pattern (e.g., have the attributes) "bought a new car" and "lives in Boston" (e.g., 10,000) and the number of users associated with the pattern "bought a new car," "lives in Boston," and "Red Sox Fan" (e.g., 9,850) is less than the ε value (e.g., 10,000−9,850<200), the pattern of "bought a new car" and "lives in Boston" may be replaced with the pattern "bought a new car," "lives in Boston," and "Red Sox Fan." Thus, the memory resources needed to store the patterns are reduced, the processing resources needed to analyze the patterns are reduced, and the processing latency associated with analyzing the patterns is reduced. This may improve the efficiency of the FP mining and FP analysis process performed by the database system 305.

In the above example, if the ε value is set to 1,000, the system 100 may determine that the new pattern (e.g., "bought a new car," "lives in Boston," and "Red Sox Fan") is uniquely interesting relative to the dataset. Accordingly, the system 100 may keep both patterns as being uniquely interesting.

Figure 4:
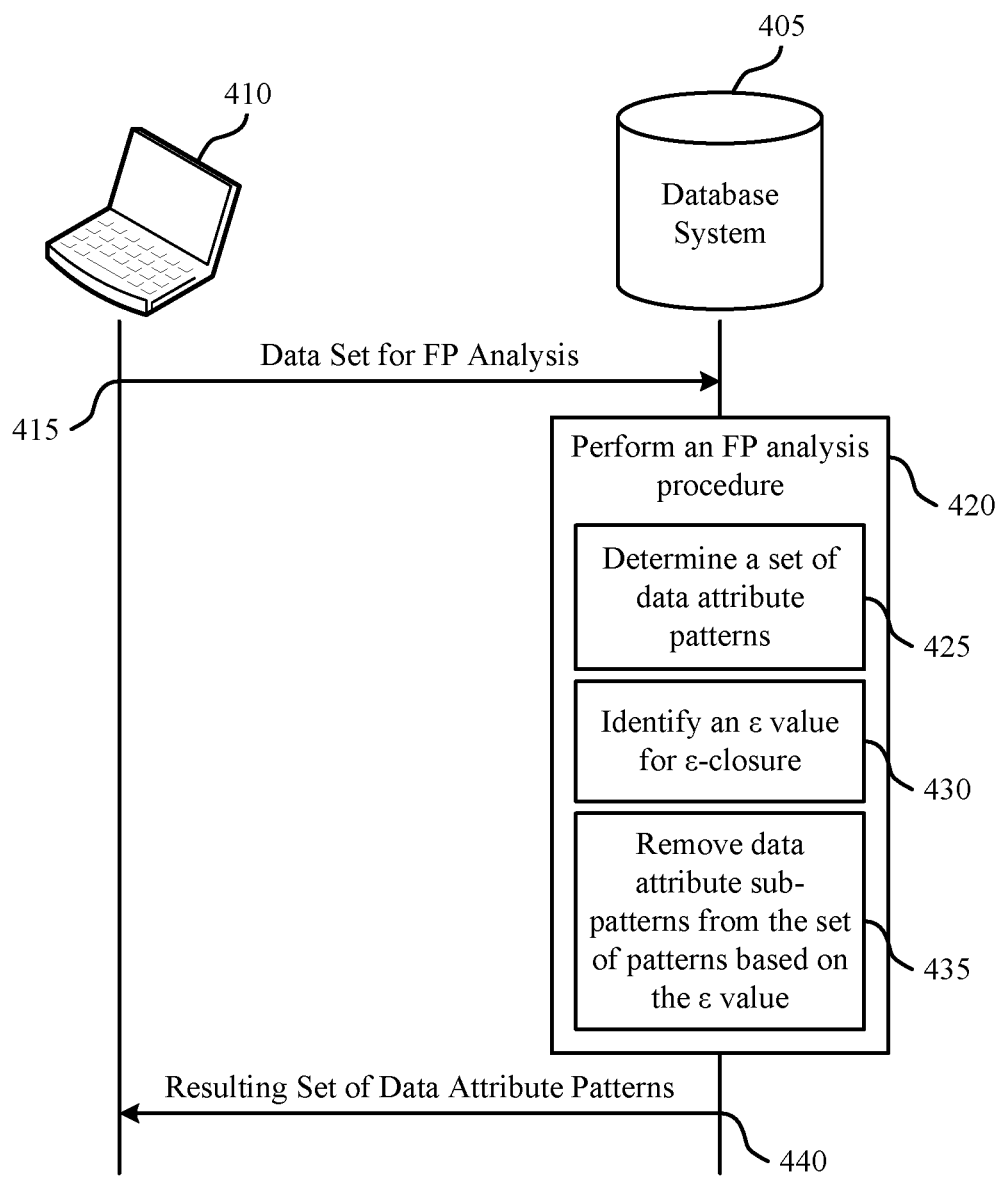
FIG. 4 illustrates an example of a process flow that supports $\varepsilon$-closure for FP analysis in accordance with aspects of the present disclosure.

FIG. 4 illustrates an example of a process flow 400 that supports ε-closure for FP analysis in accordance with aspects of the present disclosure. The process flow 400 may include a database system 405 and a user device 410, which may be examples of the corresponding devices described with reference to FIGS. 1 through 3. During an FP analysis procedure, the database system 405 may utilize a threshold occurrence difference (e.g., an ε value) or a pattern selection condition to perform ε-closure. For example, the database system 405 may track the change in data objects containing different patterns, and may remove redundant patterns based on comparing this difference with the ε value. In some implementations, the processes described herein may be performed in a different order, or may include one or more additional or alternative processes performed by the devices.

At 415, the database system 405 may receive a data set for FP analysis. For example, the database system 405 may determine the data set for analysis based on receiving an FP analysis request from the user device 410. In other cases, the database system 405 may retrieve the data set from a database (e.g., based on an event trigger or a configuration of the database system 405), where the data set contains data associated with a certain time period, a certain tenant, or some other set or subset of data. This data set may contain multiple data objects, where each data object includes a number of data attributes. Each data object may additionally include an ID. In some cases, the data objects may correspond to users or user devices, and the data attributes may correspond to activities performed by the users or user devices, parameters of activities performed by the users or user devices, or characteristics of the users or user devices.

At 420, the database system 405 (e.g., one or more data processing machines supporting the database system 405) may perform an FP analysis procedure on the data set received at 415. In some cases, the FP analysis procedure may construct a condensed data structure for efficient FP mining, where the condensed data structure includes an FP-tree and a linked list. At 425, the database system 405 may derive a set of data attribute patterns (e.g., FPs based on an FP-growth model and the condensed data structure) for the data set. Each data attribute pattern may include one or more data attributes and a number of occurrences (e.g., the support for the pattern) of the data attribute pattern within the data set. In some cases, the number of occurrences for a pattern may correspond to the number of users or user devices containing the data attributes for that pattern.

At 430, the database system 405 may identify a threshold occurrence difference for data attribute patterns. In some cases, this threshold occurrence difference may be referred to as an ε value for ε-closure. In a first example, the database system 405 may select or determine the ε value based on a number of data attributes in the data attribute pattern or sub-pattern being tested. In a second example, the database system 405 may select or determine the ε value based on a category of at least one data attribute within the data attribute pattern, or based on at least one data attribute category that differs between the data attribute pattern and the data attribute sub-pattern being tested. In a third example, the ε value may be configurable (e.g., in code by an administrative user, or in a user interface by a client).

At 435, the database system 405 may remove data attribute sub-patterns from the set of data attribute patterns based on the threshold occurrence difference. For example, if a data attribute pattern contains a sub-pattern where the difference between the number of occurrences for the sub-pattern and the number of occurrences for the pattern is less than the threshold occurrence difference, the database system 405 may remove the sub-pattern from the set of data attribute patterns. That is, for ε=100, if pattern {a, b, c} occurs 800 times in the data set, and pattern {a, b, c, d} occurs 750 times, the database system 405 may remove pattern {a, b, c} from the set of attribute patterns. This may reduce the memory and processing overhead of the system by reducing semi-redundant information.

At 440, the database system 405 may transmit an indication of the resulting set of data attribute patterns following the ε-closure procedure. The resulting set may not include less interesting patterns (e.g., patterns defined by fewer data attributes) that overlap closely with more interesting patterns based on the ε-closure procedure.

Figure 5:
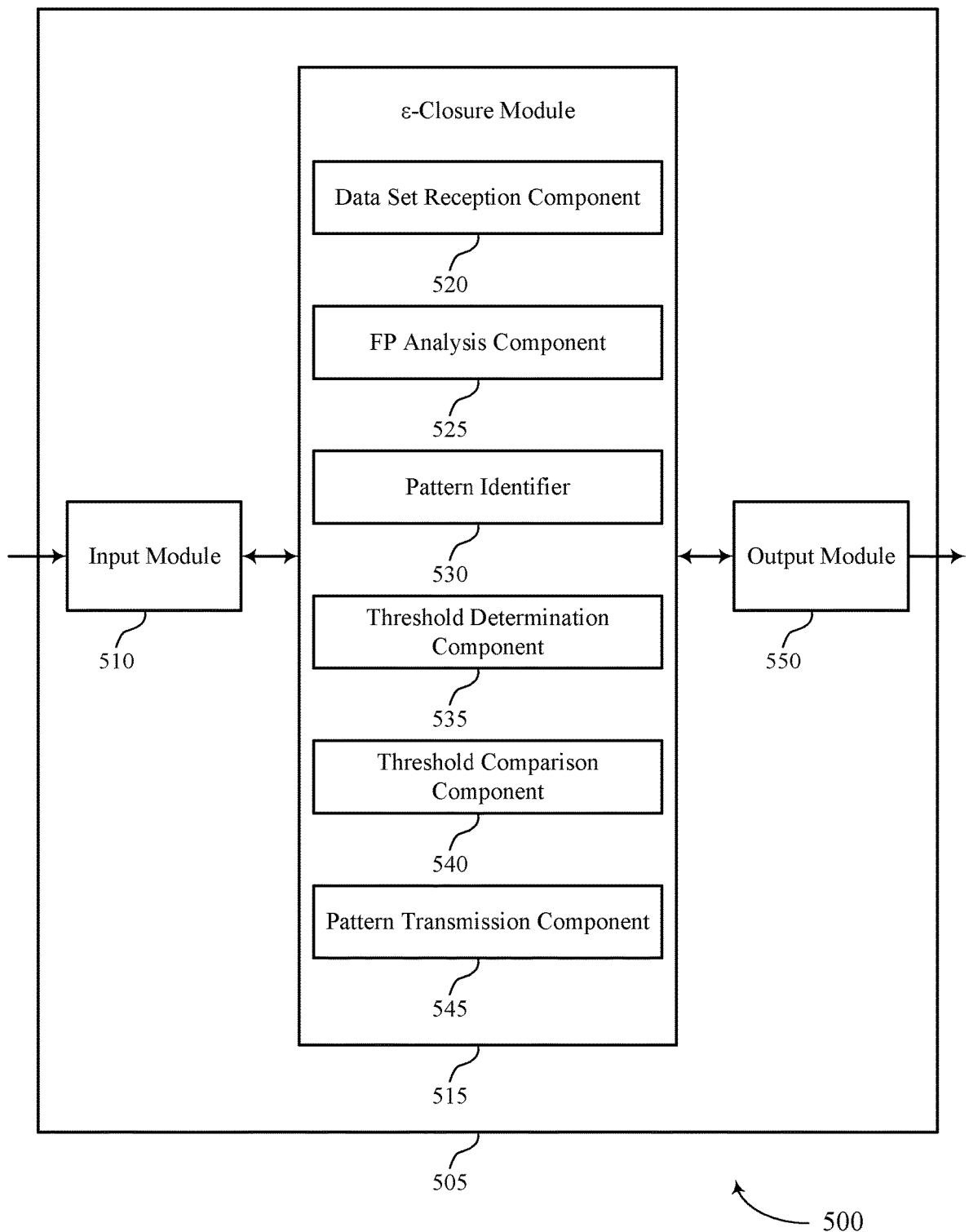
FIG. 5 shows a block diagram of an apparatus that supports $\varepsilon$-closure for FP analysis in accordance with aspects of the present disclosure.

FIG. 5 shows a block diagram 500 of an apparatus 505 that supports ε-closure for FP analysis in accordance with aspects of the present disclosure. The apparatus 505 may include an input module 510, an ε-closure module 515, and an output module 550. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the ε-closure module 515 to support ε-closure for FP analysis. In some cases, the input module 510 may be a component of an input/output (I/O) controller 715 as described with reference to FIG. 7.

The ε-closure module 515 may include a data set reception component 520, an FP analysis component 525, a pattern identifier 530, a threshold determination component 535, a threshold comparison component 540, and a pattern transmission component 545. The ε-closure module 515 may be an example of aspects of the ε-closure module 605 or 710 described with reference to FIGS. 6 and 7.

The ε-closure module 515 and/or at least some of its various sub-components may be implemented in hardware, software executed by a processor, firmware, or any combination thereof. If implemented in software executed by a processor, the functions of the ε-closure module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The ε-closure module 515 and/or at least some of its various sub-components may be physically located at various positions, including being distributed such that portions of functions are implemented at different physical locations by one or more physical devices. In some examples, the ε-closure module 515 and/or at least some of its various sub-components may be a separate and distinct component in accordance with various aspects of the present disclosure. In other examples, the ε-closure module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data set reception component 520 may receive, at a database system (e.g., the apparatus 505), a data set for FP analysis, the data set including a set of data objects, where each of the set of data objects includes a set of data attributes. In some cases, the reception component 520 may be an aspect or component of the input module 510.

The FP analysis component 525 may perform an FP analysis procedure on the received data set. The FP analysis procedure may include a pattern identifier 530 determining a set of data attribute patterns for the set of data objects of the data set, where each data attribute pattern of the set of data attribute patterns includes one or more data attributes and a number of occurrences of the data attribute pattern in the data set. In some cases, the FP analysis component 525 may construct a condensed data structure based at least in part on the data set.

The FP analysis procedure may further include a threshold determination component 535 identifying a threshold occurrence difference for data attribute patterns and a threshold comparison component 540 removing a data attribute sub-pattern of a data attribute pattern from the set of data attribute patterns if a difference between a number of occurrences of the data attribute sub-pattern and the number of occurrences of the data attribute pattern is below the identified threshold occurrence difference. The pattern transmission component 545 may transmit an indication of the set of data attribute patterns resulting from the FP analysis procedure.

The output module 550 may manage output signals for the apparatus 505. For example, the output module 550 may receive signals from other components of the apparatus 505, such as the ε-closure module 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
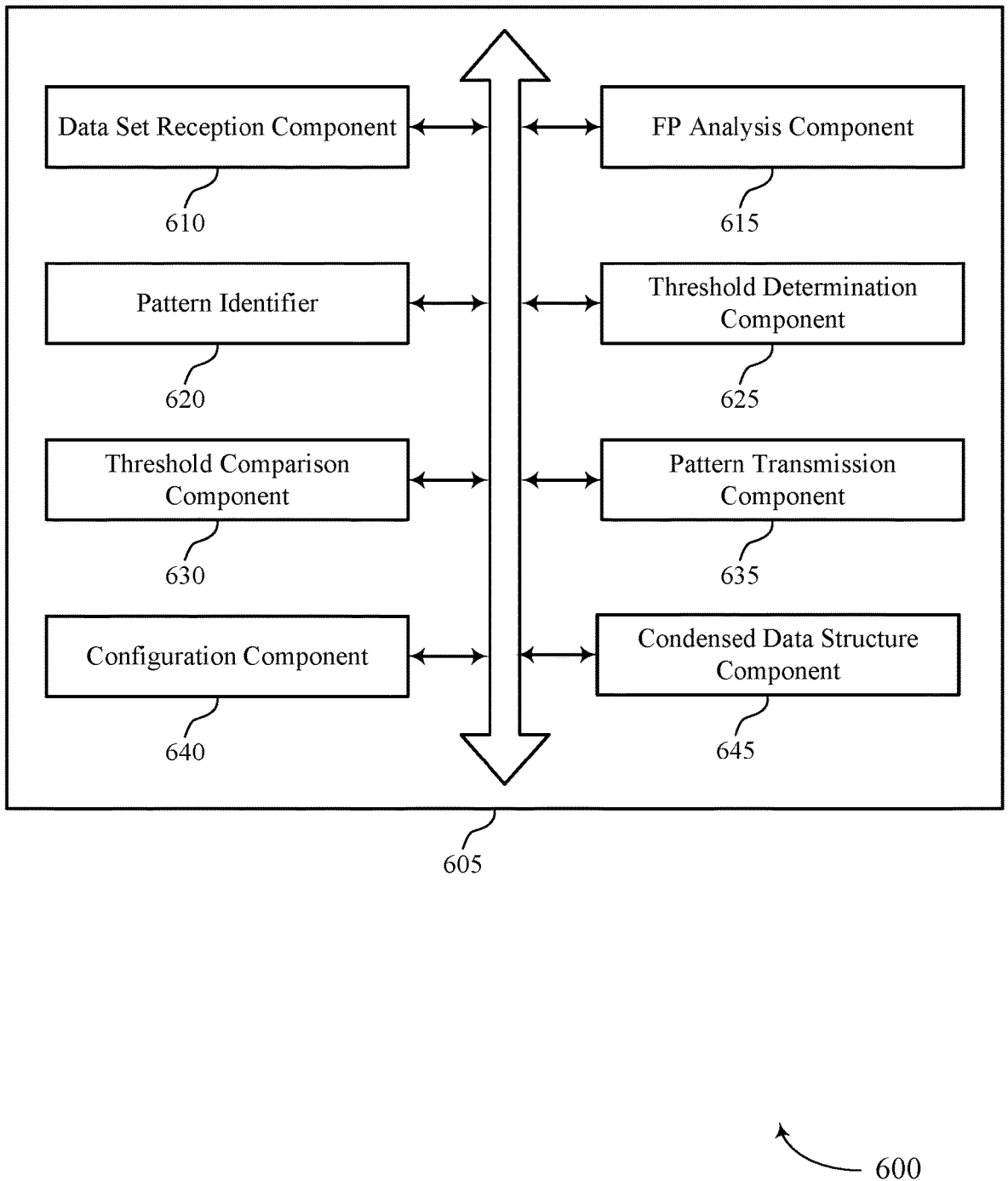
FIG. 6 shows a block diagram of an $\varepsilon$-closure module that supports $\varepsilon$-closure for FP analysis in accordance with aspects of the present disclosure.

FIG. 6 shows a block diagram 600 of an ε-closure module 605 that supports ε-closure for FP analysis in accordance with aspects of the present disclosure. The ε-closure module 605 may be an example of aspects of an ε-closure module 515 or an ε-closure module 710 described herein. The ε-closure module 605 may include a data set reception component 610, an FP analysis component 615, a pattern identifier 620, a threshold determination component 625, a threshold comparison component 630, a pattern transmission component 635, a configuration component 640, and a condensed data structure component 645. Each of these modules may communicate, directly or indirectly, with one another (e.g., via one or more buses).

The data set reception component 610 may receive, at a database system, a data set for FP analysis, the data set including a set of data objects, where each of the set of data objects includes a set of data attributes. In some cases, the reception component 610 may additionally receive, at the database system, an updated data set for FP analysis based on a pseudo-realtime FP analysis procedure. In some examples, the set of data objects may include users, sets of users, user devices, sets of user devices, or a combination thereof. Additionally or alternatively, the data attributes may correspond to activities performed by a data object, parameters of the activities performed by the data object, characteristics of the data object, or a combination thereof. In some examples, the data attributes include binary values.

The FP analysis component 615 may perform an FP analysis procedure on the received data set. The pattern identifier 620 may determine a set of data attribute patterns for the set of data objects of the data set, where each data attribute pattern of the set of data attribute patterns includes one or more data attributes and a number of occurrences of the data attribute pattern in the data set.

The threshold determination component 625 may identify a threshold occurrence difference for data attribute patterns. In some examples, the threshold determination component 625 may select a different threshold occurrence difference based on a number of data attributes in the data attribute pattern or the data attribute sub-pattern. In some examples, the threshold determination component 625 may select a different threshold occurrence difference based on a category of data attributes within a data attribute pattern or based on a category of data attributes that differs between the data attribute pattern and the data attribute sub-pattern. The configuration component 640 may configure the threshold occurrence difference.

The threshold comparison component 630 may remove a data attribute sub-pattern of a data attribute pattern from the set of data attribute patterns if a difference between a number of occurrences of the data attribute sub-pattern and the number of occurrences of the data attribute pattern is below the identified threshold occurrence difference. The pattern transmission component 635 may transmit an indication of the set of data attribute patterns resulting from the FP analysis procedure. The threshold comparison component 630 removes the data attribute pattern to reduce redundancy and more efficiently manage the memory and processing resources of the database system. When such redundant pattern removal is performed on a set of potential FPs identified by the pattern identifier, the resulting set of FPs may be greatly reduced in size, without significantly affecting the information or insight provided by the FPs.

The condensed data structure component 645 may construct a condensed data structure based at least in part on the data set received by the data set reception component 610. In some cases, the FP analysis is performed on the condensed data structure. The condensed data structure may include a data attribute list in the form of a linked list or other data structure and a FP tree. The condensed data structure may support faster FP mining (and thus, faster processing) than the original data set. The condensed data structure may also support faster querying of patterns identified by the pattern identifier 620. The condensed data structure may improve latency involved in deriving the FPs and the corresponding patterns of interest. Further, if these FPs are stored and processed locally at the data processing machine, a querying latency for retrieving the patterns may be greatly reduced, as the data processing machine may handle the query locally without having to hit a database of the data center.

Figure 7:
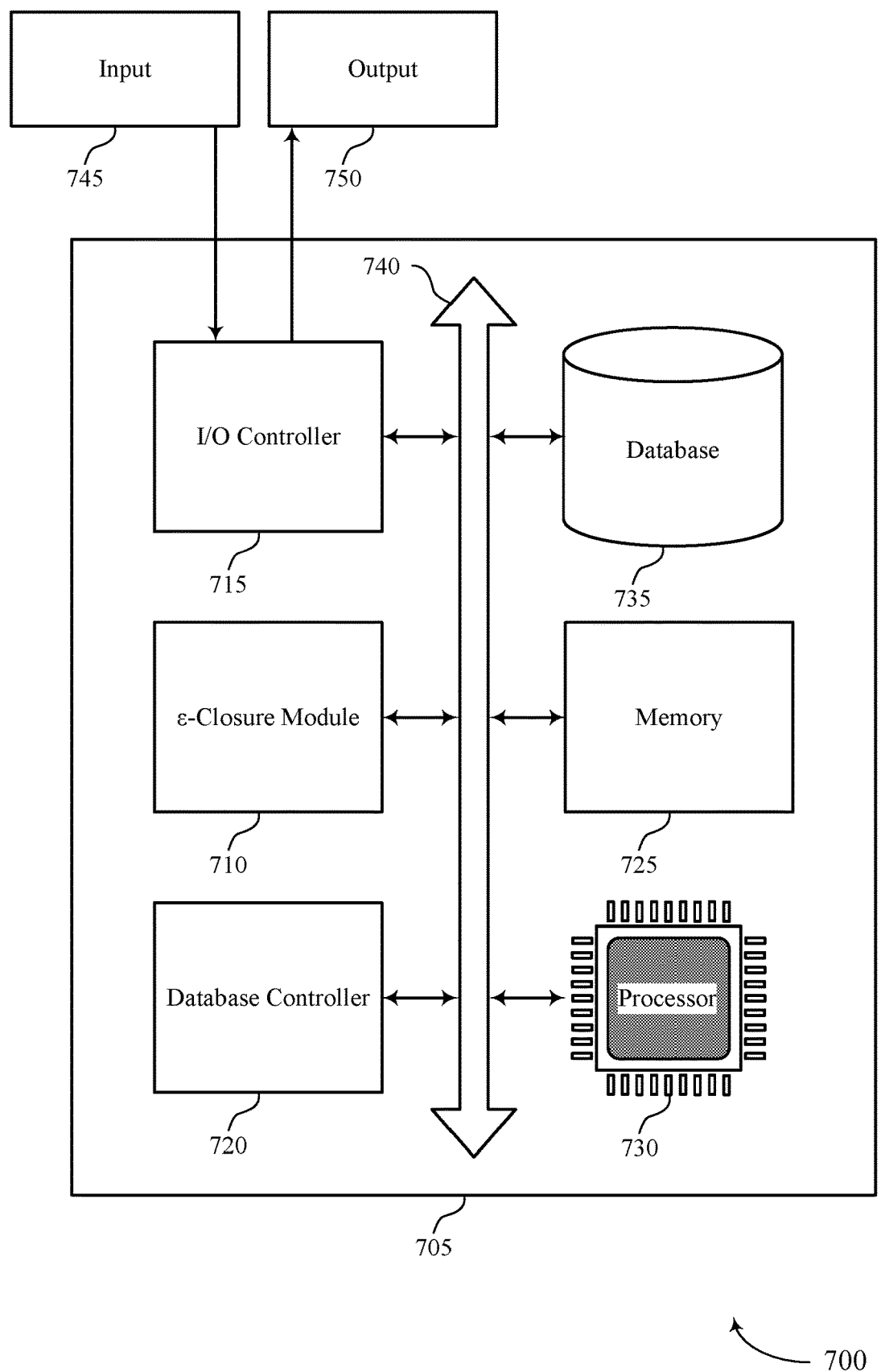
FIG. 7 shows a diagram of a system including a device that supports $\varepsilon$-closure for FP analysis in accordance with aspects of the present disclosure.

FIG. 7 shows a diagram of a system 700 including a device 705 that supports ε-closure for FP analysis in accordance with aspects of the present disclosure. The device 705 may be an example of or include the components of a database system or an apparatus 505 as described herein. The device 705 may include components for bi-directional data communications including components for transmitting and receiving communications, including an ε-closure module 710, an I/O controller 715, a database controller 720, memory 725, a processor 730, and a database 735. These components may be in electronic communication via one or more buses (e.g., bus 740).

The ε-closure module 710 may be an example of an ε-closure module 515 or 605 as described herein. For example, the ε-closure module 710 may perform any of the methods or processes described above with reference to FIGS. 5 and 6. In some cases, the ε-closure module 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting ε-closure for FP analysis).

Figure 8:
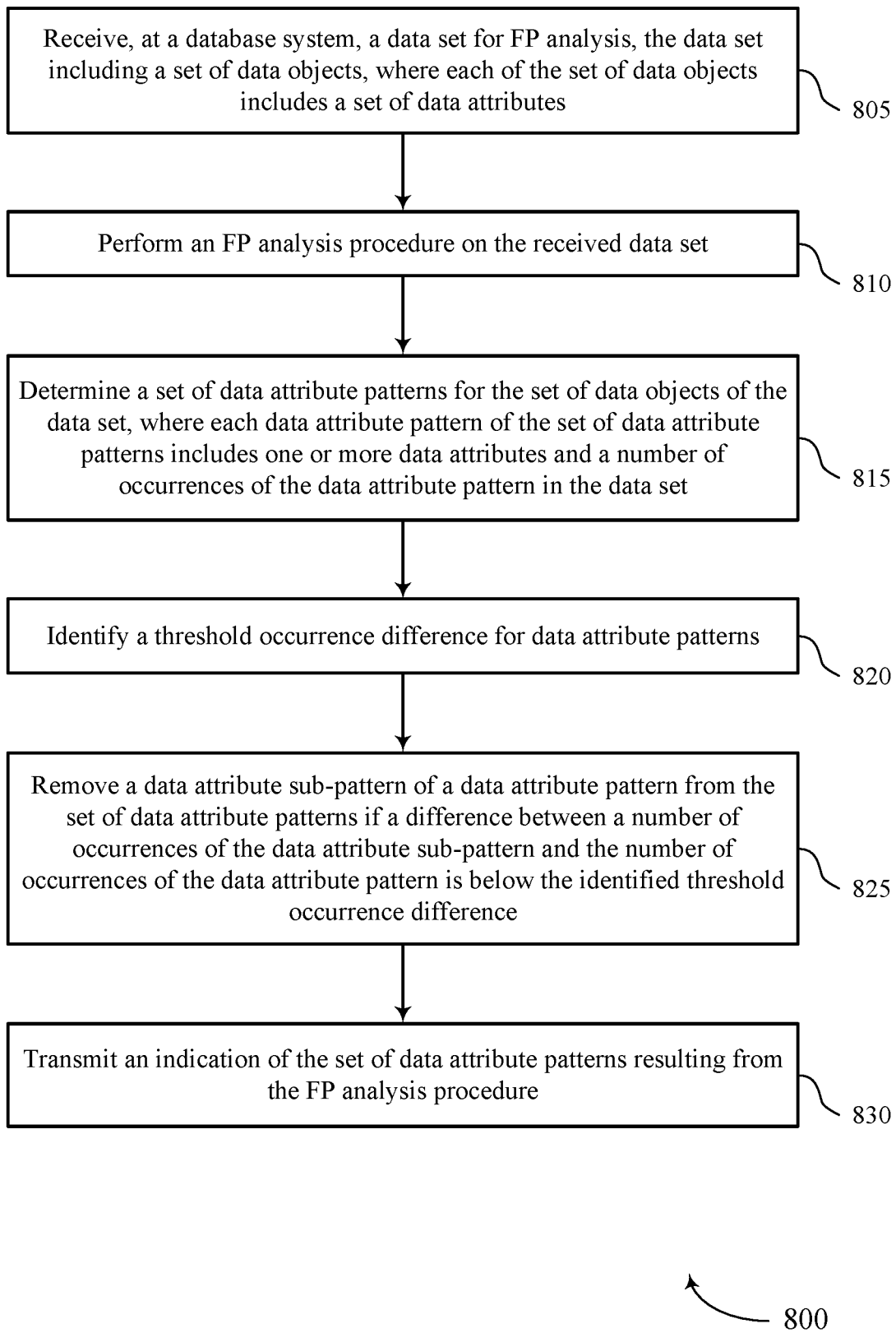
FIG. 8 shows a flowchart illustrating methods that support $\varepsilon$-closure for FP analysis in accordance with aspects of the present disclosure.

FIG. 8 shows a flowchart illustrating a method 800 that supports ε-closure for FP analysis in accordance with aspects of the present disclosure. The operations of method 800 may be implemented by a database system or its components as described herein. For example, the operations of method 800 may be performed by an ε-closure module as described with reference to FIGS. 5 through 7. In some examples, a database system may execute a set of instructions to control the functional elements of the database system to perform the functions described herein. Additionally or alternatively, a database system may perform aspects of the functions described herein using special-purpose hardware.

At 805, the database system may receive a data set for FP analysis, the data set including a set of data objects, where each of the set of data objects includes a set of data attributes. In some example implementations, the database system constructs a condensed data structure based on the received data set, and the FP analysis is performed using the condensed data structure. In some cases, the condensed data structure includes a FP-tree including identified patterns and an attribute list including one or more data attributes contained in the data set and a support corresponding to each of the one or more data attributes in the attribute list. The operations of 805 may be performed according to the methods described herein. In some examples, aspects of the operations of 805 may be performed by a data set reception component as described with reference to FIGS. 5 through 7.

At 810, the database system may perform an FP analysis procedure on the received data set. In some cases, the FP analysis procedure may include the processes described herein corresponding to steps 815, 820, and 825. The operations of 810 may be performed according to the methods described herein. In some examples, aspects of the operations of 810 may be performed by an FP analysis component as described with reference to FIGS. 5 through 7.

At 815, the database system may determine a set of data attribute patterns for the set of data objects of the data set, where each data attribute pattern of the set of data attribute patterns includes one or more data attributes and a number of occurrences of the data attribute pattern in the data set. The operations of 815 may be performed according to the methods described herein. In some examples, aspects of the operations of 815 may be performed by a pattern identifier as described with reference to FIGS. 5 through 7.

At 820, the database system may identify a threshold occurrence difference for data attribute patterns. The operations of 820 may be performed according to the methods described herein. In some examples, aspects of the operations of 820 may be performed by a threshold determination component as described with reference to FIGS. 5 through 7.

At 825, the database system may remove a data attribute sub-pattern of a data attribute pattern from the set of data attribute patterns if a difference between a number of occurrences of the data attribute sub-pattern and the number of occurrences of the data attribute pattern is below the identified threshold occurrence difference. The operations of 825 may be performed according to the methods described herein. In some examples, aspects of the operations of 825 may be performed by a threshold comparison component as described with reference to FIGS. 5 through 7.

At 830, the database system may transmit an indication of the set of data attribute patterns resulting from the FP analysis procedure. The operations of 830 may be performed according to the methods described herein. In some examples, aspects of the operations of 830 may be performed by a pattern transmission component as described with reference to FIGS. 5 through 7.

A method of FP analysis at a database system is described. The method may include receiving, at the database system, a data set for FP analysis, the data set including a set of data objects, where each of the set of data objects includes a set of data attributes, and performing an FP analysis procedure on the received data set. The FP analysis procedure may include: determining a set of data attribute patterns for the set of data objects of the data set, where each data attribute pattern of the set of data attribute patterns includes one or more data attributes and a number of occurrences of the data attribute pattern in the data set; identifying a threshold occurrence difference for data attribute patterns; and removing a data attribute sub-pattern of a data attribute pattern from the set of data attribute patterns if a difference between a number of occurrences of the data attribute sub-pattern and the number of occurrences of the data attribute pattern is below the identified threshold occurrence difference. Additionally, the method may include transmitting an indication of the set of data attribute patterns resulting from the FP analysis procedure.

An apparatus for FP analysis at a database system is described. The apparatus may include a processor, memory in electronic communication with the processor, and instructions stored in the memory. The instructions may be executable by the processor to cause the apparatus to receive, at the database system, a data set for FP analysis, the data set including a set of data objects, where each of the set of data objects includes a set of data attributes, and perform an FP analysis procedure on the received data set. The FP analysis procedure may include: determining a set of data attribute patterns for the set of data objects of the data set, where each data attribute pattern of the set of data attribute patterns includes one or more data attributes and a number of occurrences of the data attribute pattern in the data set; identifying a threshold occurrence difference for data attribute patterns; and removing a data attribute sub-pattern of a data attribute pattern from the set of data attribute patterns if a difference between a number of occurrences of the data attribute sub-pattern and the number of occurrences of the data attribute pattern is below the identified threshold occurrence difference. The instructions may be further executable by the processor to cause the apparatus to transmit an indication of the set of data attribute patterns resulting from the FP analysis procedure.

Another apparatus for FP analysis at a database system is described. The apparatus may include means for receiving, at the database system, a data set for FP analysis, the data set including a set of data objects, where each of the set of data objects includes a set of data attributes, and means for performing an FP analysis procedure on the received data set. The FP analysis procedure may include: determining a set of data attribute patterns for the set of data objects of the data set, where each data attribute pattern of the set of data attribute patterns includes one or more data attributes and a number of occurrences of the data attribute pattern in the data set; identifying a threshold occurrence difference for data attribute patterns; and removing a data attribute sub-pattern of a data attribute pattern from the set of data attribute patterns if a difference between a number of occurrences of the data attribute sub-pattern and the number of occurrences of the data attribute pattern is below the identified threshold occurrence difference. The method may further include means for transmitting an indication of the set of data attribute patterns resulting from the FP analysis procedure.

A non-transitory computer-readable medium storing code for FP analysis at a database system is described. The code may include instructions executable by a processor to receive, at the database system, a data set for FP analysis, the data set including a set of data objects, where each of the set of data objects includes a set of data attributes, and perform an FP analysis procedure on the received data set. The FP analysis procedure may include: determining a set of data attribute patterns for the set of data objects of the data set, where each data attribute pattern of the set of data attribute patterns includes one or more data attributes and a number of occurrences of the data attribute pattern in the data set; identifying a threshold occurrence difference for data attribute patterns; and removing a data attribute sub-pattern of a data attribute pattern from the set of data attribute patterns if a difference between a number of occurrences of the data attribute sub-pattern and the number of occurrences of the data attribute pattern is below the identified threshold occurrence difference. The instructions may be further executable by the processor to transmit an indication of the set of data attribute patterns resulting from the FP analysis procedure.

Some examples of the method, apparatuses, and non-transitory computer-readable medium described herein may further include operations, features, means, or instructions for selecting a different threshold occurrence difference based on a number of data attributes in the data attribute pattern or the data attribute sub-pattern.

Some examples of the method, apparatuses, and non-transitory computer-readable medium described herein may further include operations, features, means, or instructions for selecting a different threshold occurrence difference based on a category of data attributes within a data attribute pattern or based on a category of data attributes that differs between the data attribute pattern and the data attribute sub-pattern.

Some examples of the method, apparatuses, and non-transitory computer-readable medium described herein may further include operations, features, means, or instructions for configuring the threshold occurrence difference.

Some examples of the method, apparatuses, and non-transitory computer-readable medium described herein may further include operations, features, means, or instructions for constructing a condensed data structure based at least in part on the data set, wherein the FP analysis procedure is performed using the condensed data structure.

Some examples of the method, apparatuses, and non-transitory computer-readable medium described herein may further include operations, features, means, or instructions for the condensed data structure including a FP-tree including identified patterns and an attribute list including one or more data attributes contained in the data set and a support corresponding to each of the one or more data attributes in the attribute list.

Some examples of the method, apparatuses, and non-transitory computer-readable medium described herein may further include operations, features, means, or instructions for wherein each of the plurality of data objects corresponding to a user or a user device.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for reducing memory and processor resource overhead associated with frequent pattern (FP) analysis at a database system, comprising:
   receiving, at the database system, a data set for FP analysis, the data set comprising a plurality of data objects, wherein each of the plurality of data objects comprises a set of data attributes;
   performing, at the database system, an FP analysis procedure on the received data set, wherein the FP analysis procedure comprises:
      determining a set of data attribute patterns for the plurality of data objects of the data set, wherein each data attribute pattern of the set of data attribute patterns comprises one or more data attributes and a number of occurrences of the data attribute pattern in the data set;
      identifying a data attribute sub-pattern of a data attribute pattern from the set of data attribute patterns, the data attribute pattern comprising a first set of data attributes and the data attribute sub-pattern comprising a subset of the first set of data attributes;
      calculating a difference between a number of occurrences of the identified data attribute sub-pattern and the number of occurrences of the data attribute pattern;
      comparing the calculated difference to a threshold occurrence difference, the threshold occurrence difference defining a threshold value for a difference between numbers of occurrences for a sub-pattern and a pattern; and
      managing memory and processing resource usage at the database system by removing the identified data attribute sub-pattern from the set of data attribute patterns, the removing based at least in part on the comparing and the calculated difference being below the identified threshold occurrence difference; and
   transmitting an indication of the set of data attribute patterns resulting from the FP analysis procedure based at least in part on removing the identified data attribute sub-pattern from the set of data attribute patterns.

2. The method of claim 1, further comprising:
selecting a different threshold occurrence difference based at least in part on a number of data attributes in the data attribute pattern or the data attribute sub-pattern.

3. The method of claim 1, further comprising:
selecting a different threshold occurrence difference based at least in part on a category of data attributes within the data attribute pattern or based at least in part on a category of data attributes that differs between the data attribute pattern and the data attribute sub-pattern.

4. The method of claim 1, further comprising:
configuring the threshold occurrence difference.

5. The method of claim 1, further comprising:
constructing a condensed data structure based at least in part on the data set, wherein the FP analysis procedure is performed using the condensed data structure.

6. The method of claim 5, wherein the condensed data structure includes a FP-tree including identified patterns and an attribute list including one or more data attributes contained in the data set and a support corresponding to each of the one or more data attributes in the attribute list.

7. The method of claim 1, wherein each of the plurality of data objects corresponds to a user or a user device.

8. An apparatus for reducing memory and processor resource overhead associated with frequent pattern (FP) analysis at a database system, comprising:
   a processor,
   memory in electronic communication with the processor; and
   instructions stored in the memory and executable by the processor to cause the apparatus to:
      receive, at the database system, a data set for FP analysis, the data set comprising a plurality of data objects, wherein each of the plurality of data objects comprises a set of data attributes;

perform, at the database system, an FP analysis procedure on the received data set, wherein the instructions executable by the processor to cause the apparatus to perform the FP analysis procedure comprise instructions executable by the processor to cause the apparatus to:
- determine a set of data attribute patterns for the plurality of data objects of the data set, wherein each data attribute pattern of the set of data attribute patterns comprises one or more data attributes and a number of occurrences of the data attribute pattern in the data set;
- identify a data attribute sub-pattern of a data attribute pattern from the set of data attribute patterns, the data attribute pattern comprising a first set of data attributes and the data attribute sub-pattern comprising a subset of the first set of data attributes;
- calculate a difference between a number of occurrences of the identified data attribute sub-pattern and the number of occurrences of the data attribute pattern;
- compare the calculated difference to a threshold occurrence difference, the threshold occurrence difference defining a threshold value for a difference between numbers of occurrences for a sub-pattern and a pattern; and
- manage memory and processing resource usage at the database system by removing the identified data attribute sub-pattern from the set of data attribute patterns, the removing based at least in part on the comparing and the calculated difference being below the identified threshold occurrence difference; and transmit an indication of the set of data attribute patterns resulting from the FP analysis procedure based at least in part on removing the identified data attribute sub-pattern from the set of data attribute patterns.

9. The apparatus of claim 8, wherein the instructions are further executable by the processor to cause the apparatus to: select a different threshold occurrence difference based at least in part on a number of data attributes in the data attribute pattern or the data attribute sub-pattern.

10. The apparatus of claim 8, wherein the instructions are further executable by the processor to cause the apparatus to: select a different threshold occurrence difference based at least in part on a category of data attributes within the data attribute pattern or based at least in part on a category of data attributes that differs between the data attribute pattern and the data attribute sub-pattern.

11. The apparatus of claim 8, wherein the instructions are further executable by the processor to cause the apparatus to: configure the threshold occurrence difference.

12. The apparatus of claim 8, wherein the instructions are further executable by the processor to cause the apparatus to: construct a condensed data structure based on the data set, wherein the FP analysis procedure is performed using the condensed data structure.

13. The apparatus of claim 12, wherein the condensed data structure includes a FP-tree including identified patterns and an attribute list including one or more data attributes contained in the data set and a support corresponding to each of the one or more data attributes in the attribute list.

14. The apparatus of claim 8, wherein each of the plurality of data objects corresponds to a user or a user device.

15. A non-transitory computer-readable medium storing code for reducing memory and processor resource overhead associated with frequent pattern (FP) analysis at a database system, the code comprising instructions executable by a processor to:
- receive, at the database system, a data set for FP analysis, the data set comprising a plurality of data objects, wherein each of the plurality of data objects comprises a set of data attributes;
- perform, at the database system, an FP analysis procedure on the received data set, wherein the instructions to perform the FP analysis procedure are executable to:
  - determine a set of data attribute patterns for the plurality of data objects of the data set, wherein each data attribute pattern of the set of data attribute patterns comprises one or more data attributes and a number of occurrences of the data attribute pattern in the data set;
  - identify a data attribute sub-pattern of a data attribute pattern from the set of data attribute patterns, the data attribute pattern comprising a first set of data attributes and the data attribute sub-pattern comprising a subset of the first set of data attributes;
  - calculate a difference between a number of occurrences of the identified data attribute sub-pattern and the number of occurrences of the data attribute pattern;
  - compare the calculated difference to a threshold occurrence difference, the threshold occurrence difference defining a threshold value for a difference between numbers of occurrences for a sub-pattern and a pattern; and
  - manage memory and processing resource usage at the database system by removing the identified data attribute sub-pattern from the set of data attribute patterns, the removing based at least in part on the comparing and the calculated difference being below the identified threshold occurrence difference; and
- transmit an indication of the set of data attribute patterns resulting from the FP analysis procedure based at least in part on removing the identified data attribute sub-pattern from the set of data attribute patterns.

16. The non-transitory computer-readable medium of claim 15, wherein the instructions are further executable to: select a different threshold occurrence difference based at least in part on a number of data attributes in the data attribute pattern or the data attribute sub-pattern.

17. The non-transitory computer-readable medium of claim 15, wherein the instructions are further executable to: select a different threshold occurrence difference based at least in part on a category of data attributes within the data attribute pattern or based at least in part on a category of data attributes that differs between the data attribute pattern and the data attribute sub-pattern.

18. The non-transitory computer-readable medium of claim 15, wherein the instructions are further executable to: configure the threshold occurrence difference.

* * * * *